United States Patent [19]
Kung

[11] Patent Number: 5,748,498
[45] Date of Patent: May 5, 1998

[54] METHOD AND A DEVICE FOR DETECTING EXECUTION EFFICIENCY OF A CPU IN COMPUTER SYSTEM

[75] Inventor: Shao-Tsu Kung, Taipei, Taiwan

[73] Assignee: Compal Electronics, Inc., Taipei, Taiwan

[21] Appl. No.: 498,487

[22] Filed: Jul. 5, 1995

[51] Int. Cl.[6] .................................................... G01B 7/00
[52] U.S. Cl. .................. 364/551.01; 364/550; 364/707; 395/184.01; 395/183.13; 395/183.19
[58] Field of Search ........................... 395/250, 550, 395/500, 184.01, 183.01, 183.13, 183.15, 183.19, 486; 364/551.01, 550, 707

[56] References Cited

U.S. PATENT DOCUMENTS

| | | |
|---|---|---|
| 3,577,185 | 5/1971 | Belady .................................... 395/486 |
| 5,161,116 | 11/1992 | Schneider et al. ..................... 364/551.01 |
| 5,179,693 | 1/1993 | Kitamura et al. ........................... 395/550 |
| 5,450,349 | 9/1995 | Brown, III et al. .................... 395/183.15 |
| 5,463,775 | 10/1995 | DeWitt et al. ............................. 364/550 |
| 5,475,654 | 12/1995 | Furmura et al. ........................... 364/707 |
| 5,537,541 | 7/1996 | Wibecan .................................. 395/183.13 |

*Primary Examiner*—Emanuel T. Voeltz
*Assistant Examiner*—Hal D. Wachsman
*Attorney, Agent, or Firm*—Pro-Techtor International

[57] ABSTRACT

A method and a device for detecting execution efficiency of a CPU in computer system. The device includes an integrating circuit, an A/D converter, a microprocessor and a display, wherein the integrating circuit takes signals of M/IO# of the computer system bus and integrates the same. The A/D converter converts the signals into digital signals and the microprocessor receives the digital signals to calculate the execution efficiency of the CPU.

8 Claims, 5 Drawing Sheets

METHOD AND A DEVICE FOR DETECTING EXECUTION EFFICIENCY OF A CPU IN COMPUTER SYSTEM

BACKGROUND OF THE INVENTION

The present invention relates to a method and a device for detecting the actual execution efficiency of a CPU in computer system and displaying the same for the reference of a user.

It is known that the execution speed and operation efficiency of a CPU in computer system are very important to a user of the computer system. A program designer always desires to increase the operation efficiency of the CPU and the execution speed of a program so as to save the processing time. This can be achieved by means of fully utilizing the waiting or remaining time of the CPU. Moreover, it is always desired to monitor the operation or processing condition of the CPU or even the entire computer system. More importantly, because the CPU will consume most of the power for the computer system, the higher the execution efficiency of the CPU is, the more the power consumption of the CPU is. Therefore, it is necessary to control the execution efficiency of the CPU so as to understand the affection thereof on the power consumption of the computer system.

With respect to a common desk computer, the display attached to the housing thereof usually only shows the execution speed of the computer in a simple high/low switching manner. In such manner, a speed switching button is used to control an oscillation circuit disposed in the computer for supplying system clock signal so as to generate a fixed high frequency or low frequency system clock signal and display the manufacturer-set high/low display value at the switching time. According to such manner, the actual execution/processing speed of the CPU of the computer system is not shown or even the actual clock signal provided by the system oscillation circuit is not displayed. This is because the high/low oscillation frequency and the manufacturer-set display value are simply selectively switched by means of the speed switching button. This is well known by the computer manufacturers. Therefore, the execution efficiency and operation condition as well as the power consumption of the CPU of the computer system are not accurately indicated for the reference of the users, program designers and hardware manufacturers.

SUMMARY OF THE INVENTION

It is therefore a primary object of the present invention to provide a method and a device for detecting the execution efficiency of a CPU of computer system, which is able to accurately reflect the current execution/operation efficiency of the CPU and display the same for the reference of the users, software/hardware designers and manufacturers, especially as to the CPU of computer system with power management unit (PMU), such as notebook type computer or green PC.

In a conventional personal computer, the execution speed or power consumption of the CPU is not controllable according to the executed program. Only when the speed switching button is operated, the oscillation frequency provided by the switching will serve as the clock signal of the CPU. Therefore, the execution efficiency and power consumption of the CPU have only a high and a low frequency states, while the actual value thereof cannot be known.

The power management unit will timely control the CPU and other peripheral equipments or elements according to the working condition of the computer system, whereby when not used, the equipments or elements will go into a lower power sleeping or waiting state so as to save power and prolong the using lift of the battery. Therefore, when the computer system executes the general input program such as typing, drawing, etc. via keyboard or mouse, the PMU will control the input signal and lower the execution speed of the CPU for saving power through the stopclock input terminal of the CPU (for stopping the processing of the CPU). Reversely, when executing a program for great amount of calculation, the CPU will have higher execution efficiency and greater power consumption due to the adjustment of the PMU. Therefore, the present invention is more specifically applicable to the notebook type computer and green computer.

Moreover, the system bus M/IO# (memory/input or output device select control wire, or memory/input/output) signal is to be detected/monitored by the present invention by reasons of:

1. When the CPU executes a halt command, the M/IO# line will have a "low" signal;

2. The CPU has a stopclock input signal for directing the CPU to go into the stopping state so as to save power. (The consumed current is changed from 1200 mA to 30 mA and the consumed power is changed from 6 W to 0.15 W.) When the PMU judges that the program is in the waiting state (such as waiting for the input from the keyboard), the PMU will halt the processing of the CPU via the stopclock signal input line to go into the stopping state for saving power. Meanwhile, the M/IO# signal will be a "low" signal.

3. The possibility of the error is not high that in I/O period, when the M/IO# "low" without the management of the PMU, the CPU is still used for data processing.

4. On the other hand, when the M/IO# signal is "high", generally the CPU is in a high efficiency state of executing the program or processing data.

Therefore, the main detecting method of the present invention is to take the computer bus M/IO# signal and integrate the signal to obtain an average reference voltage value representing the current execution efficiency of the CPU. The ratio of the average reference voltage value to the high potential voltage (high potential (1) of the digital circuit) of the M/IO# is the execution efficiency ratio of the CPU. By means of the efficiency ratio and the clock signal frequency or the working or waiting state of the CPU, a multiplication or calculation can be performed to obtain the information on the execution efficiency such as working speed and power consumption of the CPU under the control of the PMU.

The detecting device of the present invention includes an integrating circuit, an A/D converter, a microprocessor (or calculator) and a display. The input terminal of the integrating circuit is connected with the system bus M/IO# line. The output signal of the integrating circuit is converted into digital value by the A/D converter for the microprocessor (or calculator) to calculate the relative ratio. The display then displays the same for the reference of the user.

The present invention can be best understood through the following description and accompanying drawings, wherein:

BRIEF DESCRIPTION OF THE DRAWINGS

FIGS. 4-1 is a diagram of the M/IO# signal of the system bus before being integrated; and FIG. 4-2 is a diagram of the M/IO# signal of the system bus after being integrated.

DETAILED DESCRIPTION OF THE PREFERRED EMBODIMENT

Figure 1:
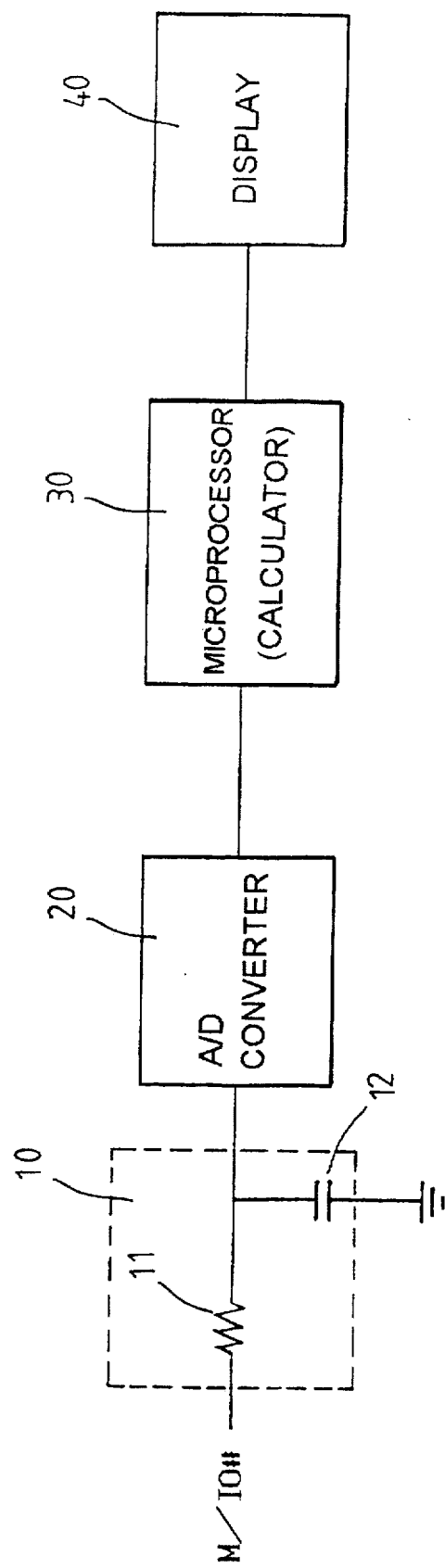
FIG. 1 is a block diagram of the detecting device of the present invention.

Please refer to FIG. 1. The detecting device of the present invention mainly includes an integrating circuit 10 composed of a resistor 11 and a capacitor 12 and connected to the system bus M/IO# signal line, an A/D converter 20 parallelly connected with the capacitor 12 of the integrating circuit 10, a microprocessor (or calculator) 30 and a display 40 connected with the microprocessor 30.

In order to understand the operation of the resistor 11 and capacitor 12 of the integrating circuit, please refer to FIG. 2 which is drawn according to the temporary charging equation of the capacitor as follows:

$$Vc(t)=E(1-e^{-t/RC}),$$

wherein:

Vc (t): temporary voltage of the capacitor when charged;

E: voltage of the power supply;

e: natural logarithm;

RC: time constant (determined by the product of resistance by capacitance); and t: charging time.

When t is RC, 2RC, 3RC, 4RC, Vc is 63%E, 86%E, 95%E, 98%E respectively. With respect to the charging efficiency, from 0RC to 1RC, 1RC to 2RC, 2RC to 3RC, 3RC to 4RC, the efficiency is 63%, 23%, 9%, 3% respectively. The charging efficiency is reduced with the increment of time and accumulation of capacitor charge. The time for reaching 100%E charging voltage should be infinitely large. The larger the time constant RC is, the longer the charing time is and the smoother the charging curve is. Reversely, the smaller the time constant RC is, the shorter the charging time is and the steeper the charging curve is.

Figure 3:
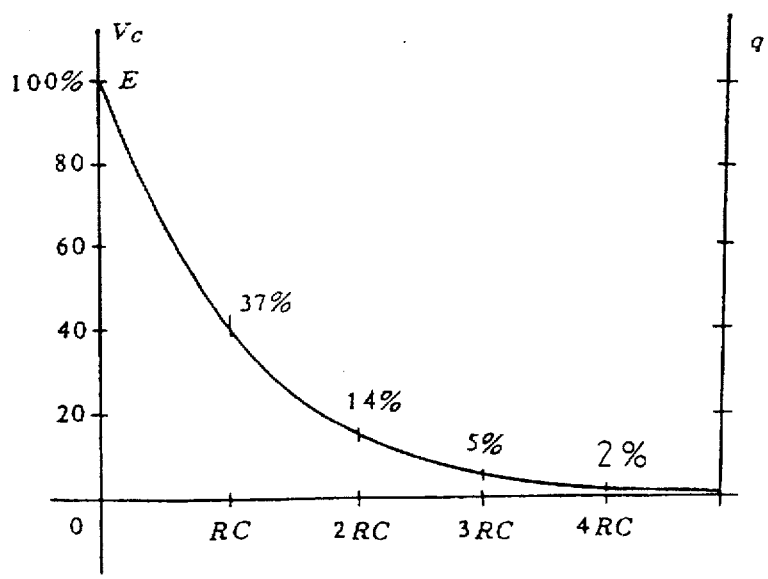
FIG. 3 is a charge-time diagram of the RC circuit when discharging the capacitor.

Please refer to FIG. 3 which is drawn according to the temporary discharging equation of the capacitor as follows:

$$Vc(t)=Ee^{-t/RC},$$

wherein:

Vc (t): temporary voltage of the capacitor when discharged;

E: voltage of the power supply;

e: natural logarithm;

RC: time constant (determined by the product of resistance by capacitance); and t: discharging time.

When t is RC, 2RC, 3RC, 4RC, Vc is 37%E, 14%E, 5%E, 2%E respectively. With respect to the discharging speed, from 0RC to 1RC, 1RC to 2RC, 2RC to 3RC, 3RC to 4RC, the speed is 63%, 23%, 9%, 3% respectively. The discharging speed is reduced with the increment of time and reduction of capacitor charge. The time for reaching 0 V discharging voltage should be infinitely large. The larger the time constant RC is, the longer the discharing time is and the smoother the discharging curve is. Reversely, the smaller the time constant RC is, the shorter the discharging time is and the steeper the discharging curve is as the charging time and charging curve.

Figure 2:
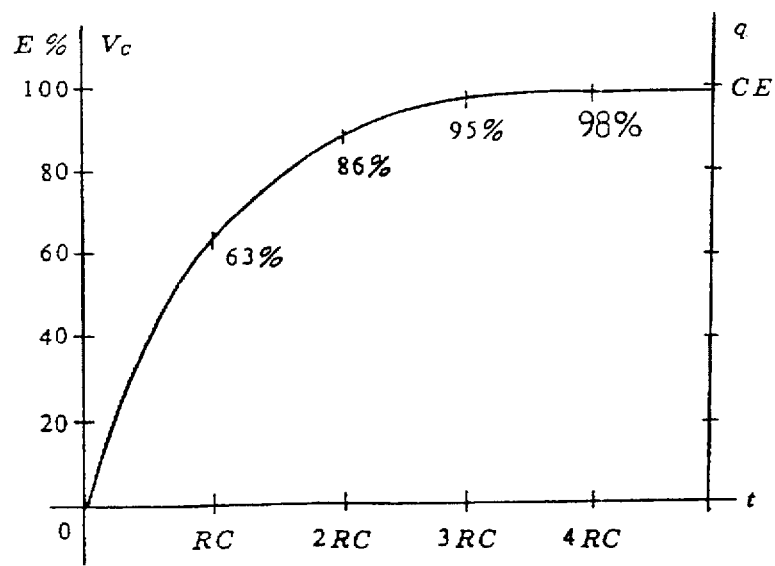
FIG. 2 is a charge-time diagram of the RC circuit when charging the capacitor.
Figure 4A:
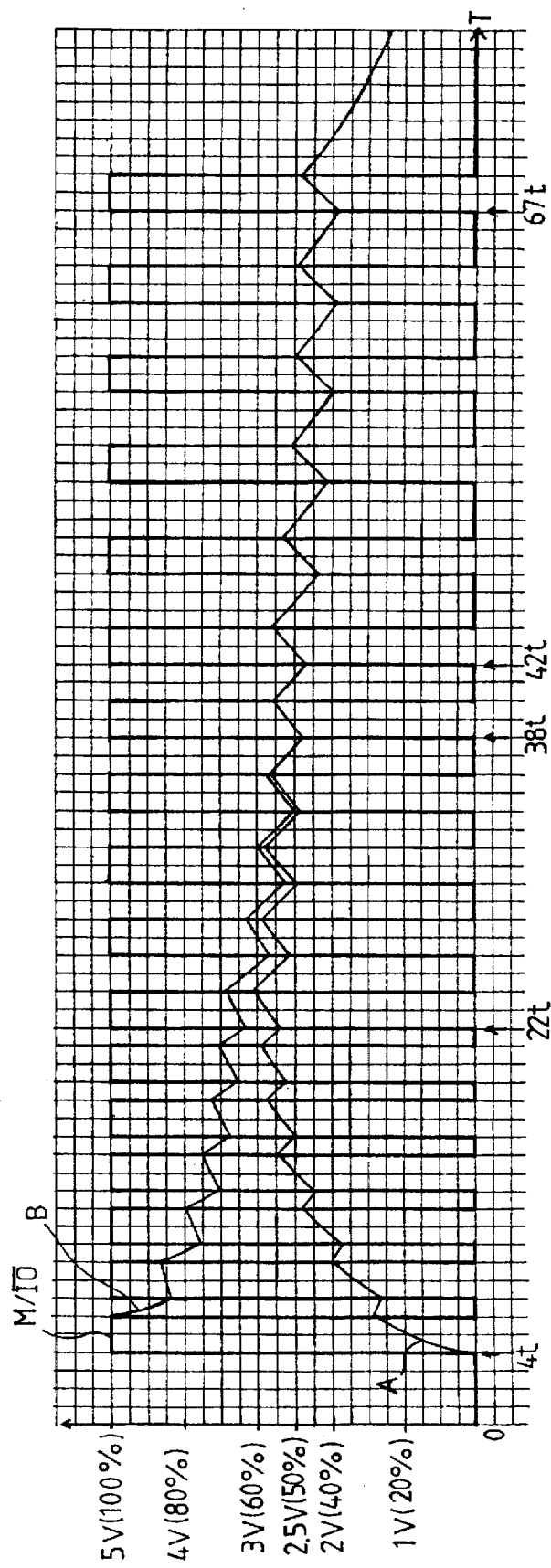
Figure 4B:
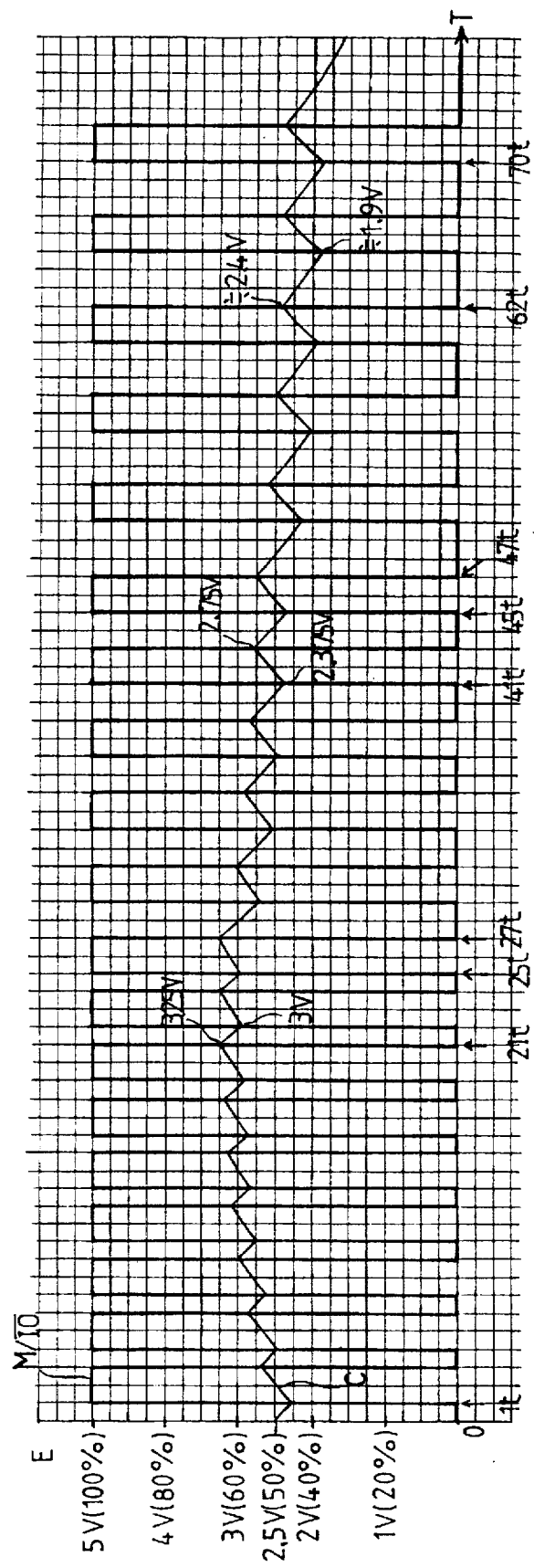
Figure 5:
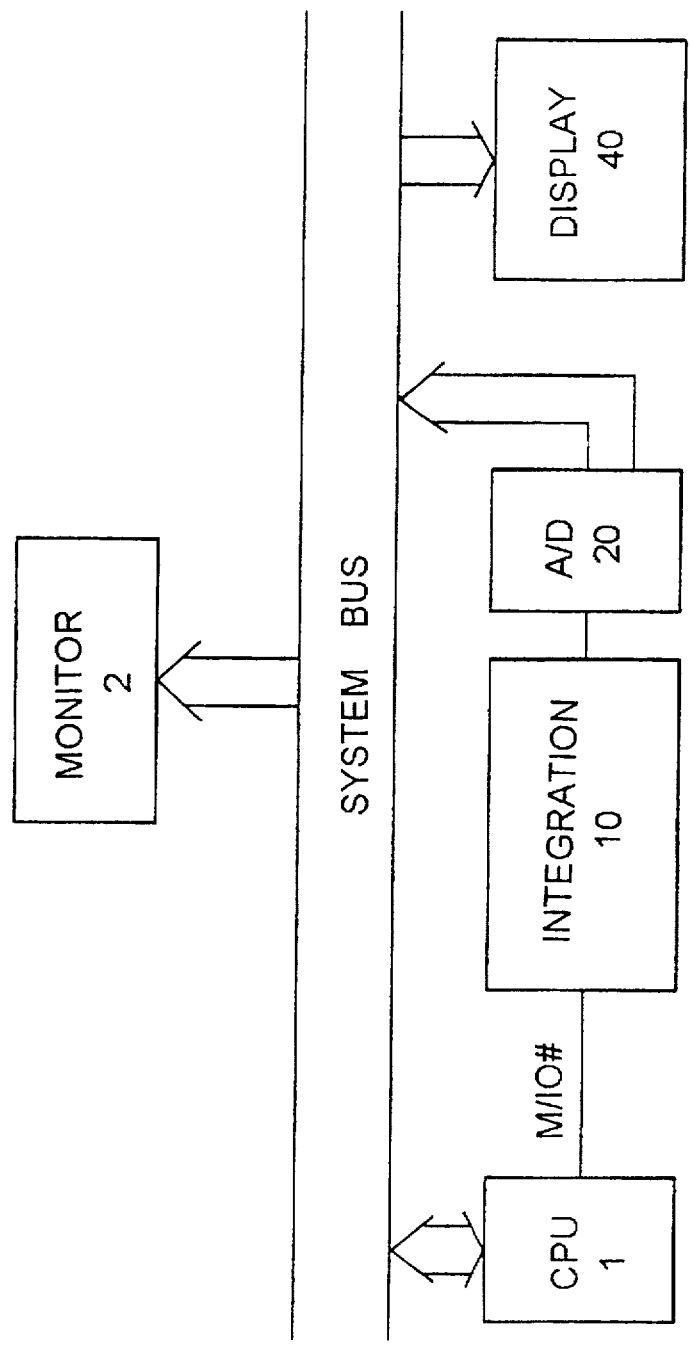
FIG. 5 is a block diagram of the device utilizing a CPU and a monitor.

FIGS. 4-1 is a diagram of the M/IO# signal of the system bus before integrated and FIG. 4-2 is a diagram of the M/IO# signal of the system bus after integrated. In FIG. 4-1, in each period of the M/10# signal, when T=4t to 22t, high frequency duration is 2t, while low frequency duration is t. When T=22t to 42t, high frequency duration is 2t, while low frequency duration is 2t. When T=42t to 67t, high frequency duration is 2t, while low frequency duration is 3t. Curve A shows the terminal voltage variation of the capacitor 12 generated during charging/discharging of M/IO# signal with an initial state of 0 charge stored in the capacitor 12. Curve B shows the terminal voltage variation of the capacitor 12 generated during charging/discharging of M/IO# signal with an initial state of high 5 V potential of the capacitor 12. When high charge is accumulated in the capacitor, the charging curve thereof is smoother, while the discharging curve is steeper. Reversely, when less charge is stored in the capacitor, the charging curve thereof is steeper, while the discharging curve is smoother. Therefore, no matter how much the charge initially stored in the capacitor 12 is, the curves A and B will meet and coincide with each other at T=38t to have the same result.

In FIG. 4-2, in each period of the M/IO# signal, when T=1t to 25t, high frequency duration is 2t, while low frequency duration is t. When T=25t to 45t, high frequency duration is 2t, while low frequency duration is 2t. When T=45t to 70t, high frequency duration is 2t, while low frequency duration is 3t. Curve C shows the terminal voltage variation of the capacitor 12 generated during charging/discharging of M/IO# signal with an initial state of 2.5 voltage of the charge stored in the capacitor 12. When T=1t to 25t, the level of the saw tooth wave of curve C gradually ascends. While when T is from 21t to 27t, the variation of wave peak and wave valley (3.25 V to 3 V) of curve C becomes stable. After T=27t, because the low frequency duration of the M/IO# signal is prolonged to 2t, the level of the saw tooth wave of curve C is downward biased. When T=41t to 47t, the variation is again stable and the level of the wave peak-wave valley is maintained within 2.75 to 2.375 V. When T=47t to 70t, the low frequency duration is 3t long, the level of the saw tooth wave of curve C descends. When T=62t, the level is stably maintained within about 2.4 V to 1.9 V.

In order to easily compare the reference voltage curves of the M/O# signal before and after integrated by the integrating circuit 10, the example of the period of the M/IO# signal is relatively long so as to make the variation of the curve more apparent for easy observation and enlarge the voltage change between the wave peak and wave valley of the curve. In general condition of the computer system, the period of the M/IO# signal is only several mS. Therefore, in fact, the voltage change between the wave peak and wave valley is relatively smooth.

By means of the smooth integrated signal representing the execution efficiency, the A/D converter 20 can obtain the digital reference value for the microprocessor (or calculator) 30 to calculate the efficiency percentage. The display 40 will then display the same to achieve the object of detecting, calculating and displaying the execution efficiency of the CPU.

In fact, with respect to the displaying measure, preferably a small LED or LCD is externally disposed on the computer to serve as the display. Alternatively, a pop-up window can be formed on the monitor of the computer to achieve the object of displaying. However, such measure may reduce or waste the execution efficiency of the CPU. Also, the CPU can take charge of the work of the A/D converter 20 or the microprocessor 30. However, this may similarly waste the execution efficiency of the CPU. Therefore, it is preferably to externally add the above elements to the computer.

In conclusion, the integrating circuit of the present invention can accurately obtain the execution efficiency reference data of the CPU from the M/IO# signal characteristics and display the same for the reference of the user or program designer.

The above description and drawings are only used for illustrating an embodiment of the present invention. Many derivations or modifications of the embodiment can be made without departing from the spirit of the present invention.

What is claimed is:

1. A method for detecting execution efficiency of a CPU in a computer system, comprising the steps of:
    A. monitoring memory/input/output signals of a bus of said computer system,
    B. integrating said signals,
    C. calculating a resultant ratio of said integrated signals to a high potential of said input/output/memory signal to determine said execution efficiency of said CPU, and
    D. comparing said resultant ratio to a power consumption level of said CPU in a working state and a power consumption level of said CPU in a power-saving state to calculate a power consumption of said CPU.

2. A device for detecting execution efficiency of a CPU in a computer system comprising:
    an integrating circuit,
    an A/D converter,
    a microprocessor, and
    a display means; wherein
    said integrating circuit receives memory/input/output signals of a computer system bus and integrates said memory/input/output signals to yield integrated signals,
    the A/D convertor converts the integrated signals into digital signals, and
    the microprocessor receives said digital signals and calculates an execution efficiency of said CPU, said execution efficiency is then displayed by said display means.

3. The device as claimed in claim 2 wherein:
    said integrating circuit is an RC circuit comprising a resistor and a capacitor.

4. The device as claimed in claim 2 wherein:
    said display means is an LED.

5. The device as claimed in claim 2 wherein:
    said display means is an LCD.

6. The device as claimed in claim 2 wherein:
    said display means is a pop-up display on a monitor of said computer system.

7. A device for detecting execution efficiency of a CPU in a computer system comprising:
    an integrating circuit,
    an AD converter, and
    a display means; wherein
    said integrating circuit receives memory/input/output signals of a computer system bus and integrates said memory/input/output signals to yield integrated signals, the A/D convertor converts the integrated signals into digital signals, and
    said CPU receives said digital signals and calculates an execution efficiency of said CPU, said execution efficiency is then displayed by said display means.

8. The device as claimed in claim 7 wherein:
    said display means is a pop-up display on a monitor of said computer system.

* * * * *